Figure 1:
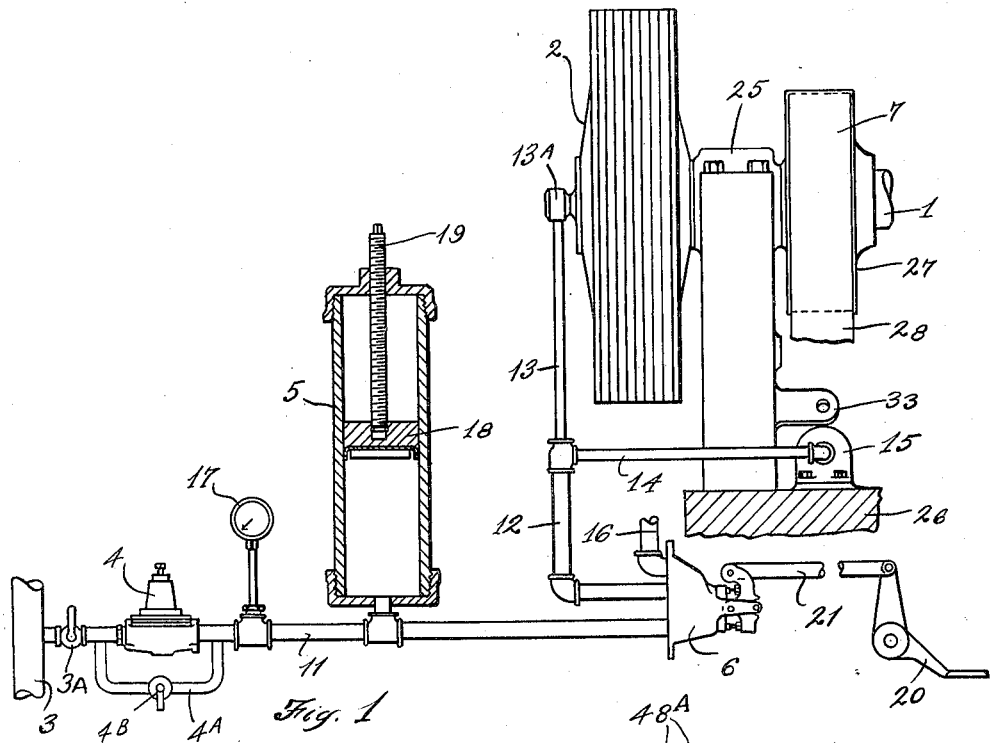

March 3, 1936.  W. W. CRILEY  2,032,836

DRIVE MEANS FOR FORGING MACHINES AND THE LIKE

Filed Jan. 13, 1934  2 Sheets-Sheet 1

INVENTOR.
William W. Criley
BY
Fay, Oberlin & Fay
ATTORNEYS

Patented Mar. 3, 1936

2,032,836

UNITED STATES PATENT OFFICE 2,032,836

DRIVE MEANS FOR FORGING MACHINES AND THE LIKE

William W. Criley, Cleveland, Ohio

Application January 13, 1934, Serial No. 706,528

8 Claims. (Cl. 78—13)

My invention relates to an apparatus and method for operating heavy machinery such as forging machines, power presses, coining presses, bulldozers, and similar apparatus where clutch operation is desirable but where quick pick-up and release are essential and where a heavy torque load must be taken quickly and dropped quickly. My invention aims to provide quick acting clutch operation, both as to engagement and release, for such machinery; it furthermore aims to accomplish, by mechanism and method, protection for the machine against torque overload, and reserve torque capacity for relieving the machine after the clutch has functioned as an overload protection; to provide smooth pick-up operation, increasing strength of engagement as the torque load increases and in a very short space of time; to give a reserve capacity to handle torque overloads when necessary; to insure that the pneumatic operation of the clutch will not be affected by ordinary fluctuations of pressure in the source of air supply; to permit the air supply for clutch operation to be set and held within whatever range may be most desirable for any particular run or series of operations and to provide an immediate source of air supply for the clutch and its attendant mechanism which will be connected to the clutch by short air passages, irrespective of the location of the primary source of air supply.

A further aim is to so locate the clutch in the driving mechanism that angular motion at the clutch during engagement and disengagement will be substantially reduced in its effect on the movement of the work-engaging elements of the machine.

The invention may be used with any form of friction clutch in which the friction surfaces are held in contact with a pressure directly proportional to the pressure of the operating fluid, and in which there are no elements which can yield at a pressure below that used for operation. A form of clutch especially well adapted for use in the present invention is illustrated herewith, but the invention is not limited to use with such particular form. The specific clutch shown and described is, however, well adapted for such use by reason of the fact that it operates quickly, is so constructed that the greater part of the weight of the clutch and clutch mechanism is constantly moving so that the inertia of the parts to be picked up within the clutch itself is relatively low, and the clutch has the further advantage of operating with a small amount of air, and thus requiring relatively small air lines.

To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
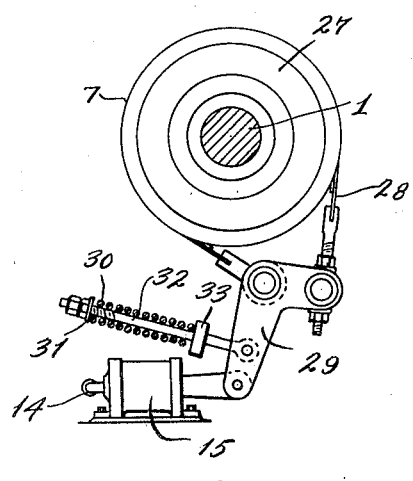
Figure 3:
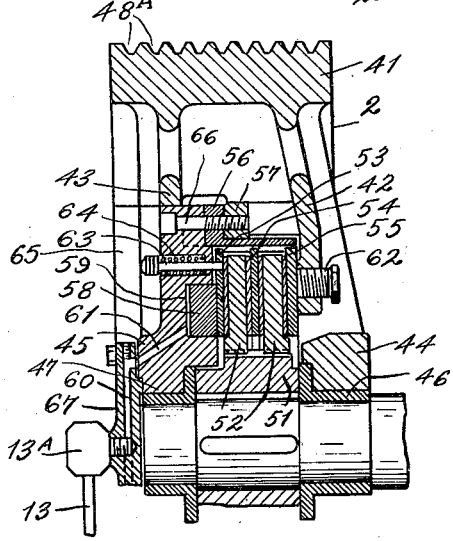
Figure 4:
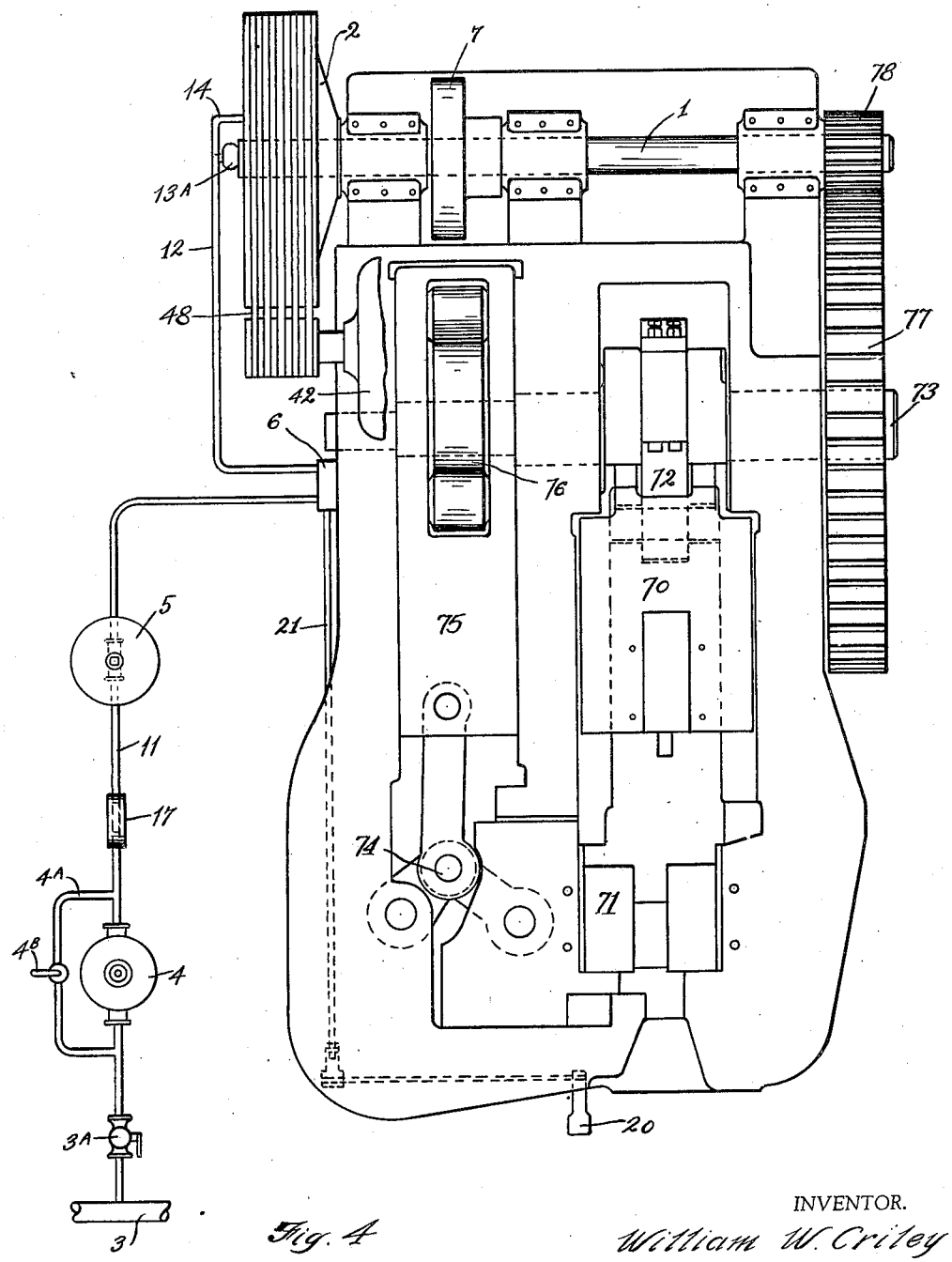

In said annexed drawings, Fig. 1 is a diagrammatic elevation, partly sectional, of an illustrative embodiment of my invention; Fig. 2 is a side elevation of a suitable form of brake for use with my invention; Fig. 3 is a transverse axial half section through a preferred form of clutch; and Fig. 4 is a plan view showing in somewhat diagrammatic style, by way of illustration, my invention as applied to a forging machine.

Referring now to Fig. 1, the preferred mechanical embodiment of my invention is illustrated as comprising, in association with the countershaft 1 of the driven machine, a clutch 2, and pneumatic supply and control arrangements. These arrangements include a source of air supply, such as a shop main 3, reducing valve 4, by-pass 4A, reservoir 5, admission and exhaust valve 6, and brake 7.

The details of the connections are subject to variation to fit any particular case. Those illustratively shown include a branch 11 connected to the shop main 3 through a shut-off and regulating valve 3A. This branch 11 leads alternately either through a reducing valve 4 or a by-pass 4A, the latter being opened or closed by a cock 4B. A reservoir 5 and admission valve 6 are connected to the branch 11 and a pressure gauge, such as 17 may also be connected wherever convenient. A lead 12 from the valve 6 divides into branches 13 and 14, the former going to the clutch 2 through an inlet 13A and the latter to the air cylinder 15 and the brake 7. An exhaust pipe 16 is also connected to the valve 6, the valve being so constructed as to either connect the branch 11 and the lead 12 or to cut off the branch 11 and connect the lead 12 to the exhaust 16.

The reservoir 5 is here shown as of variable capacity, the effective size being limited by an air-tight movable head 18, positioned by a screw 19. It will be appreciated that any suitable air storage may be employed and, if variable, such capacity variation may be obtained in any appropriate way.

The valve 6 is here shown as operable from a distance by means of a pedal 20 and connecting rod 21. The interior construction may be of any standard arrangement suitable to connect the pipes 11 and 12 and close the exhaust 16, or to close the pipe 11 and connect 12 and 16, and is therefore not illustrated.

The countershaft 1 is carried in suitable bearings 25 on the machine frame 26. A brake drum 27 is secured to the countershaft, this drum being engaged by a band 28 which is actuated from the air cylinder 15 through a bell crank lever 29. In the arrangement shown in Fig. 2, admission of air to the cylinder 15 moves the long arm of the bell crank 29 to the right, releasing the band and compressing a spring 30 which bears at one end against a washer 31 carried upon a rod 32. This rod 32 passes through an ear 33 on the machine frame, against which the other end of the spring 30 bears. This arrangement is conventional and other mechanism of similar effect may be substituted therefor.

A preferred form of clutch 2, is herein illustrated in Fig. 3, and shown in more detail in Patent No. 1,968,130 which issued July 31, 1923. This clutch comprises a casing which, with its assembled parts, constitutes the driving element and comprises a rim 41, webs 42 and 43, and hubs 44 and 45. The hubs bear rotatably upon the countershaft 1 at 46 and 47. Power is applied to the driving element by appropriate means, such as a series of V-belts 48 running in grooves 48A. A collar 51, keyed to the countershaft 1 between the hubs 44 and 45, carries the driven plates 52, internally toothed or splined to the collar so as to be capable of limited axial movement thereon. These plates are interspaced with driving plates 53, 54 and 55, all mounted by teeth or other suitable engaging means for axial movement only within a liner 56 which is secured on an inner rim 57 of the casing 2. It will be understood that the number of driving and driven plates will vary according to clutch size and other considerations. In the example shown, the first driving plate 53 is acted upon by a piston 58 to interengage the series of plates. The piston 58 is a ring, movable in a corresponding annular groove 59, hereafter called the "cylinder" on account of its function. The branch 13 is connected to the clutch by an inlet collar 13A. A plurality of radially disposed compressed air channels such as 60, 61 run from the inlet 13A to the cylinder 59.

Fig. 3 illustrates the engaged position, and shows one important feature of the present clutch, namely, the short movement by which it is set and released. Adjustment to compensate for plate face wear and to regulate the requisite piston travel is by means of screw adjusting plugs 62 in the web 42, bearing against the driving plate 55, which plugs can be set up or backed off without removing any parts of the clutch. Bolts such as 63, fastened at their inner ends into the driving plate 53, are surrounded each by a coil spring 64 which is compressed, as shown, when the clutch plates are engaged, and accordingly move the plate 53 and return the piston 58 to the bottom of the cylinder 59 when air pressure is released at the valve 6. By reason of the close adjustment which can be maintained, and the slight piston travel required, the clutch illustrated operates with a small air consumption relatively to its size, and thus, even with relatively small air connections, the clutch is quick to engage and release.

For ready accessibility more or less of the central part 65 of the web 43, according to the size of the clutch and other factors of design, may preferably be made separable from the rest of the clutch casing, and, if convenient, integral with the hub 45. This removable central part 65, sometimes called the cover, is here shown fastened to the main body of the casing by fillister screws 66. In the preferred form shown the cylinder 59 is formed in the inner surface of the cover. A central opening in this cover 65 is closed by a cap 67, removable to give access to the shaft and shaft connections. The air channels 60 and 61 are formed in the cap 67 and the cover 65 respectively, and are aligned in continuity from the inlet 13A of the branch 13 to the cylinder 59.

Besides the fact that this clutch operates with a small piston travel and consequent small air consumption, and can be adjusted, without removal of parts, to maintain close clearances, it will be apparent from the foregoing description that since the casing and the parts which rotate therewith are the greater part of the mass of the clutch, and the driven parts are of relatively slight mass, the inertia to be overcome within the clutch itself when the clutch is engaged, and conversely the momentum due to the clutch mechanism to be checked by the brake 7 when the clutch is released and the machine stopped is relatively small.

Fig. 4 illustrates, in plan view, the application of my invention applied to a forging machine of conventional type having a header slide 70 and die slide 71, the header slide being connected by a crank 72 to the main shaft 73 and the die slide being driven by a toggle connection from a cam slide 75, which in turn takes its motion from a cam 76 on the main shaft 73. The main shaft 73 has a large gear 77 fast upon one end. This gear meshes with and is driven by a pinion 78 on the corresponding end of the countershaft 1. The clutch 2 and brake 7 are seen on the countershaft 1, as in Fig. 1. The clutch 2, which is also the flywheel of the machine, is driven by the belts 48 from a motor 42 conveniently mounted on top of the forging machine.

Placing the clutch on the countershaft 1 rather than on the main shaft gives the result that such relative rotation between the clutch elements as occurs while the clutch is engaging or releasing is reduced at the main shaft, thus enhancing the accuracy of movement which is imparted to the slides. This is particularly desirable in enabling the operator to "inch" the header slide 30 within close limits, and is also useful in making short movements of the die slide 71.

It should be understood that the same or similar clutch and brake arrangement could be applied to presses, bulldozers and a great variety of other machines where stop motion or intermittent operation are required.

To run the machine, the operator steps on the pedal 20, thus opening the valve 6 and letting air pressure from the reservoir 5 into the line 12 and branches 13 and 14. Thus the clutch is engaged and the brake released. The full advantage of the invention is obtained by using the clutch shown in Fig. 3, in which the amount of piston travel is very low and the quantity of air required very small. As illustrated with that clutch, the air is admitted to the annular space 59 (the so-called "cylinder"). Thereupon the piston moves forward, engaging the moving plates with the stationary plates and thus applying power to the countershaft 1. At the same time air in the cylinder 15 moves the brake lever 29, Fig. 2, counter-clockwise, releasing the band 28. To stop the machine the pedal is released, exhausting the clutch cylinder 59 and brake cylinder 15, whereupon the springs 64 disengage the clutch plates, and the spring 30 applies the brake.

In the operation of the invention is may be assumed for illustrative purposes that the shop main 3 carries a pressure of 100 pounds to the square inch, which is cut down by the reducing valve 4 to, say, 60 pounds in the reservoir. The air pressure in the reservoir of course drops on the opening of the valve. If it be assumed, for example, that the effective capacity of the reservoir 5 is 400 cubic inches and the quantity of air to operate the clutch and brake is 100 cubic inches, the reservoir pressure will drop to 48 pounds when the clutch is first engaged. This reduced pressure causes the clutch to engage the stationary parts which are to be thrown into motion softly and smoothly without the shock that would result were the full torque power of the clutch applied immediately upon opening of the operating valve. The reducing valve 4 immediately allows entrance of more air to the system and will be set to admit air to the reservoir at a rate to restore the reservoir pressure quickly to 60 pounds. Thus, in the use of the invention on a forging machine, while the header slide 70 is moving forward in its stroke, the air pressure in the reservoir and behind the clutch piston will come up to the full 60 pounds. Thus, there is an increase of effective engaging pressure on the clutch plates as the torque load increases, so that maximum pressure of engagement is obtained before maximum torque load. That is, the clutch is engaged with full force by the time the tools on the header slide strike the work.

By proper regulation of the reducing valve 4, thus proportioning the effective air pressure to the size of the machine and the load to be carried, the clutch can be effectively operated as an overload safety. Thus, in the foregoing example, if 60 pounds air pressure is sufficient to maintain the clutch in engagement under ordinary working loads, the clutch will slip when extraordinary resistance is met with. Consequently the proper adjustment of air pressure gives the clutch the added function of a slip safety device, preventing injury to the machine by overload resistance.

In the event of the machine getting stuck or bound, particularly by overload working resistance, it will obviously be necessary to apply the clutch with more than the normal working pressure in order to hold the parts to back off the machine or force it through the resistance. This can be obtained by opening the pressure regulating valve 4 or the by-pass cock 4B of the by-pass line 4A, thus permitting air at the full shop main pressure, 100 pounds in the illustration, to flow through into the air line 11 and thus apply 100 pounds to the clutch. In the event that it is not advisable to apply this full pressure for backing off, a less pressure, but in excess of the working pressure, may be applied by manual operation of the by-pass cock, the pressure being indicated by the gauge 17 and stored in the cylinder 5.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a forging machine, header and die slides, a main shaft to which said slides are operatively connected, drive means to said main shaft including a pneumatic clutch and means for supplying air to said clutch with pressure increasing after said clutch engages.

2. In a forging machine, header and die slides, a main shaft to which said slides are operatively connected, drive means to said main shaft including a pneumatic clutch and means for supplying air to said clutch with pressure increasing after said clutch engages, means for service use for stopping said pressure increase below the highest available, and further means for emergency use supplying the clutch at the highest available pressure.

3. In a forging machine, header and die slides, a main shaft to which said slides are operatively connected, drive means to said main shaft including a pneumatic clutch and an air supply system for said clutch comprising a service reservoir, a manual valve between said reservoir and clutch, an air supply source at higher than service pressure, and valve means automatically operable to admit air up to service pressure to said clutch and reservoir and selectively operable to so admit air above service pressure.

4. In a heavy duty machine the combination of a reciprocating work-forming element, a main shaft operatively connected thereto, reduction drive means of substantial ratio for said main shaft, a source of power to said reduction drive means, a friction clutch in a higher speed element of said reduction drive means, and means for increasing the clutch pressure after initial application.

5. In a forging machine in combination, a header slide and means for applying power thereto, said means including a main shaft in driving relation to said header slide, a countershaft, means connecting said countershaft and said main shaft at a substantial speed reduction to the main shaft, and a quick-acting fluid pressure friction clutch on said countershaft and having an actuating member directly acted upon by pressure fluid, said clutch constituting the sole means for transmitting working power to said countershaft.

6. In a heavy duty machine the combination of a reciprocating work-forming element, a main shaft operatively connected thereto, reduction drive means of substantial ratio for said main shaft, said reduction drive means including a countershaft, a source of power to said reduction drive means, and a quick-acting fluid-pressure friction clutch adapted to connect said source of power to said countershaft, and thereby transmit full working power.

7. In a machine of the class described, a crankshaft, a source of power, and a train of reduction gearing from said source to said shaft, a fluid-actuated clutch in said train of gearing, and clutch-actuating means comprising a pressure reservoir, a valve for opening said reservoir to said clutch, and a pressure supply at higher pressure than said reservoir, means for supplying fluid under said higher pressure immediately subsequent to the supply from the reservoir.

8. In a machine of the class described, a crankshaft, a source of power, and a train of reduction gearing from said source to said shaft, a fluid-pressure clutch, sources of pressure fluid applicable to said clutch, said source being at different pressures, means for applying first the lower and then the higher pressure to said clutch, and auxiliary means for applying a third degree of pressure higher than either of the preceding to said clutch.

WILLIAM W. CRILEY.